United States Patent [19]
Shikata et al.

[11] Patent Number: 6,051,806
[45] Date of Patent: Apr. 18, 2000

[54] POWER SUPPLY APPARATUS FOR WELDERS AND METHOD OF MANUFACTURING SAME

[75] Inventors: Kunio Shikata, Minoo; Masayuki Ono, Toyonaka; Masao Katooka, Kawanishi; Haruo Moriguchi, Itami; Tetsuro Ikeda, Osaka; Kenzo Danjo, Soraku-gun; Atsushi Kinoshita; Fumi Noda, both of Osaka; Hideo Ishii, Minoo, all of Japan

[73] Assignee: Sansha Electric Manufacturing Co., Limited, Osaka, Japan

[21] Appl. No.: 09/236,703

[22] Filed: Jan. 25, 1999

[30] Foreign Application Priority Data

Jan. 27, 1998 [JP] Japan .................................. 10-030579

[51] Int. Cl.$^7$ ...................................................... B23K 9/10
[52] U.S. Cl. ................................ 219/130.33; 219/130.31; 219/130.32
[58] Field of Search .......................... 219/130.33, 130.31, 219/130.32, 130.4, 137 PS, 130.1

[56] References Cited

U.S. PATENT DOCUMENTS

| | | | |
|---|---|---|---|
| 5,315,089 | 5/1994 | Hughes et al. ..................... | 219/137 PS |
| 5,343,016 | 8/1994 | Davis et al. . | |
| 5,824,991 | 10/1998 | Mita et al. ......................... | 219/130.51 |
| 5,831,240 | 11/1998 | Katooka et al. ..................... | 219/130.1 |
| 5,877,952 | 3/1999 | Moriguchi et al. .................. | 219/130.4 |

FOREIGN PATENT DOCUMENTS 8-243744 9/1996 Japan .
2081478 2/1982 United Kingdom .

*Primary Examiner*—Clifford C. Shaw
*Attorney, Agent, or Firm*—Duane, Morris & Heckscher LLP

[57] ABSTRACT

A power supply apparatus for welders includes an input-side AC-to-DC converter for converting an input commercial AC voltage into a DC voltage, which is, in turn, converted to a high-frequency voltage in an inverter. The high-frequency voltage is transformed to a high-frequency voltage having a desired magnitude in a transformer. The transformed high-frequency voltage is then converted back to a DC voltage in an output-side high-frequency-to-DC converter. The DC voltage is developed between output terminals of the power supply apparatus. A current detector detects the current flowing through the output terminals and develops a detected-current representative signal. A voltage detector detects the voltage between the output terminals and develops a detected-voltage representative signal. A CPU has three control modes and controls, in a first mode, the inverter in such a manner that the current representative signal becomes equal to a reference-current representative signal. In a second mode, the CPU activates and, then, deactivates a high-frequency generator, which provides a high-frequency voltage between the output terminals, and, thereafter, performs the first mode of control. In a third control mode, the CPU controls the inverter in such a manner that the voltage representative signal becomes equal to a reference-voltage representative signal and also controls a wire feeder for feeding a wire to be connected to one of the output terminals.

10 Claims, 5 Drawing Sheets

POWER SUPPLY APPARATUS FOR WELDERS AND METHOD OF MANUFACTURING SAME

This application is based on Japanese Patent Application No. HEI 10-30579 filed on Jan. 27, 1998, which is incorporated in this application by reference.

The present invention relates to a power supply apparatus which can be used with various types of welding machines and to a method of manufacturing it.

BACKGROUND OF THE INVENTION

Various types of welding are known, such as manual welding, TIG (Tungsten Inert Gas) welding and MIG (Metal Inert Gas) welding. Various types of power supply apparatus are used for respective types of welding. One of the basic arrangements of such power supply apparatuses is as follows. A commercial AC voltage is rectified and smoothed into a DC voltage by an input-side rectifier and a smoothing capacitor. The DC voltage is then converted into a high-frequency voltage in an inverter and, then, transformed in a voltage-transformer. The transformed, high-frequency voltage is rectified in an output-side rectifier and is applied to a load. If occasion demands, the DC voltage from the output-side rectifier is converted into a low-frequency AC voltage before it is applied to the load. With this arrangement, a DC voltage is converted into a high-frequency voltage by an inverter, which permits the use of a small-sized voltage-transformer. As a result, the whole power supply apparatus can be made small.

A power supply apparatus for manual welding exhibits a fixed current output characteristic as shown by a curve A-2 in FIG. 2, in which output current is kept constant even when an output voltage changes. An output current setting device 2 for setting the constant output current is mounted on a control panel of a manual welding power supply apparatus as shown in FIG. 1. In manual welding, "hot starting" is employed, in which, as shown in a portion B-2 of FIG. 2, current larger than the fixed output current is provided to a welder for reliable initiation of arcing when the welding operation is to be started or when a load including a torch and a workpiece is short-circuited. A hot-start setting device 4 for setting current to flow during the hot start period is disposed on the control panel, too. A display 6, which displays an output voltage and output current, is also on the control panel.

DC TIG welding is suitable for welding, e.g. stainless steel. A power supply apparatus for a DC TIG welder has a fixed-current output characteristic as shown by a curve A-5 in FIG. 5. DC TIG welding may be "hot started", if occasion demands, as is understood from the characteristic portion B-5 in FIG. 5.

For welding a flat workpiece by TIG welding, the output current of the power supply apparatus is maintained constant as indicated by the curve A-5 in FIG. 5. However, if constant current is applied to the TIG welder when a workpiece, e.g. a pipe and, in particular, a round bottom portion of a horizontally disposed pipe is welded, melt may drop from the pipe, requiring another welding. Sometimes, such melt may adhere to the electrode of the TIG welder to make the electrode unusable.

To avoid such problems, as shown in FIG. 4, it has been proposed to apply a pulse current to the TIG welder in place of a constant output current. The pulse current shown in FIG. 4 comprises a base portion $I_B$ from which pulses $I_P$ extend repetitively. During each current portion $I_B$, a molten pool formed on the bottom of the pipe is cooled to thereby prevent the melt from dropping or adhering to the welding electrode.

There are two methods for initiating an arc in TIG welding. One is to supply a small current to a welding electrode and a workpiece which are contacting each other, and, then, separate the electrode from the workpiece, which results in arcing between the electrode and the workpiece. This method is called "touch starting". In this specification, the welding with "touch starting" is called "touch-start welding". The other method is a "high frequency starting", in which a high-frequency, high-voltage is applied between a welding electrode and a workpiece spaced from each other. The voltage to be applied has a frequency of, for example, from 1 MHz to 3 MHz and a magnitude of, for example, from 5 KV to 20 KV. The application of such voltage causes an arc to be generated between the electrode and the workpiece. In this specification, the welding with "high frequency starting" is called "high-frequency-start welding".

Thus, as shown in FIG. 3, on a control panel of a DC TIG welder power supply apparatus, there are disposed, an output current setting device 8 for setting the magnitude of the output current, a hot start setting device 10, and an upslope and downslope time setting device 12. The upslope and downslope time setting device 12 is used to set an upslope time TU required for a pulse output current to rise from a initiating current Id to a peak pulse current, i.e. the set output current $I_P$ and to set a downslope time TD required for the pulse output current to decrease from the peak current $I_P$ down to a crater current $I_C$ which flows at the end of the welding operation. Also, a pulse frequency setting device 14 for setting the frequency F (=1/T) of the pulse current, a pulse switch 16 for switching the supplied current between a pulse current and a DC current, an arc starting mode switch 18 for switching the starting mode between the touch starting and the high frequency starting, and a display 20 for displaying the output voltage and the output current are disposed on the control panel.

AC TIG welding is another TIG welding. There is a power supply apparatus for use with a TIG welder operable from both AC and DC (hereinafter referred to AC/DC TIG welder). DC TIG welding using an AC/DC TIG welder power supply apparatus is the same as the DC TIG welding with the above-described DC TIG welding power supply apparatus.

AC TIG welding may be used for aluminum welding. A workpiece of aluminum typically has an oxide film of a high melting point thereon. Therefore, if a DC power supply apparatus is used to supply current, with the workpiece being positive and with the welding electrode being positive, the temperature of the workpiece cannot rise enough. Accordingly, the workpiece cannot be welded. On the other hand, if current is supplied, while the electrode is held positive with the workpiece being negative, thermoelectrons are discharged from the workpiece, and the thermoelectrons remove the oxide film from the surface of the workpiece, which is called an cleaning effect, so that it becomes possible to weld the workpiece. However, if the workpiece kept positive when current is supplied, the electrode can be cooled. Then, the AC TIG welding, in which an AC voltage is applied between the workpiece and the torch or welding electrode, has both cleaning and electrode cooling effects. The cleaning effect and the cooling effect can be optimized by appropriately adjusting the ratio of the time t1 during which current is supplied with the workpiece being positive and with the electrode being negative, to the time t2 during which the workpiece is placed negative (see FIG. 7).

As shown in FIG. 6, on a control panel of an AC/DC TIG welder power supply apparatus, there are disposed an output current setting device 22, a hot-start setting device 24, an upsloping and downsloping time setting device 26, a pulse frequency setting device 28, a pulse switch 30 for providing or removing pulse current, a starting mode switch 32 for switching the arc starting mode between the touch starting mode and the high-frequency starting mode, all for DC TIG welding. Also disposed is a display 34 for displaying the magnitudes of output voltage and current. In addition, a frequency setting device 36 for setting the frequency of the voltage and a duty ratio setting device 38 for setting the ratio of the positive to negative portions of the pulse voltage, both for the AC TIG welding are also disposed on the control panel.

MIG welding is used for welding steel plates. A welding wire is forwarded to a workpiece by a wire feeding machine, and a voltage is applied between the workpiece and the wire. The wire is brought into contact with the workpiece, so that current flows between them to generate Joule heat. The Joule heat melts the wire portion which is in contact with the workpiece. The molten wire material is separated from the wire and drops onto the workpiece. As the wire is separated from the workpiece, an arc is generated between them. The wire is heated and melted by the arc to produce a molten droplet of the wire material, which short-circuits the wire and the workpiece. Then, the droplet drops onto the workpiece, so that the wire and the workpiece are separated from each other, causing an arc to be generated between them. During this process, the wire feeding machine continues to feed the wire. This process is repeated, so the wire melts to weld the workpiece. A power supply apparatus for use in MIG welding has a constant-voltage supplying characteristic.

In the MIG welding, it is necessary to suppress a large current which would flow when the wire and the workpiece are short-circuited by a molten wire material. On the other hand, it requires a reactor having a small reactance which allows a large current to flow when an arc is initially generated. Accordingly, in MIG welding, a small reactance reactor is used, while suppressing the current flowing during short-circuiting.

For this purpose, a power supply apparatus for MIG welding includes, as shown in FIG. 8, an output current setting device 40, a short-circuiting current setting device 42 for setting the magnitude of the current flowing when the workpiece and the welding wire are short-circuited, a welding wire feeding rate setting device 44 and an output voltage and current display 46. These devices are all disposed on a control panel of the power supply apparatus.

A single power supply apparatus which would be used for all of the above-described various types of welding would be complicated in structure, because of the necessity of many setting devices and of the complicated setting operation of the respective setting devices.

Therefore, an object of the present invention is to provide a power supply apparatus which can be easily adapted for use with various types of welding. Another object of the present invention is to provide such a power supply apparatus in which various settings required for any specific welding can be made relatively easily.

SUMMARY OF THE INVENTION

A power supply apparatus for welders according to the present invention includes an input-side AC-to-DC converter for converting a commercial AC voltage to a DC voltage. A DC-to-high-frequency converter converts the DC voltage from the AC-to-DC converter to a high-frequency voltage. A transformer transforms the high-frequency voltage to a voltage having a predetermined value. The transformed, high-frequency voltage from the transformer is converted back to a DC voltage in an output-side high-frequency-to-DC converter. The resulting DC voltage is developed between two output terminals, which are adapted to be connected to a welder load. The power supply apparatus also includes a current detector for detecting current which will flow through the output terminals of the power supply apparatus when a load is connected to the output terminals and for developing a current-representative signal representing the detected current. The power supply apparatus includes further a voltage detector for detecting the voltage between the two output terminals and developing a voltage-representative signal representing the detected voltage. A controller controls the DC-to-high-frequency converter. The controller has first, second and third control modes and controls the DC-to-high-frequency converter in accordance with a selected one of the three control modes. The controller in the first control mode controls the DC-to-high-frequency converter in such a manner that the current-representative signal from the current detector can be equal to a reference-current-representative signal representing a predetermined reference current. In the second control mode, the controller controls the DC-to-high-frequency converter in the same manner as in the first control mode after activating and and, then, deactivating a high-frequency generator which may be connected to generate a high-frequency voltage between the output terminals of the power supply apparatus. In the third control mode, the controller controls the DC-to-high-frequency converter in such a manner that the voltage-representative signal can be equal to a reference-voltage-representative signal representing a predetermined reference voltage, and also controls a wire feeder which may be connected to feed a wire to be connected to one of the two output terminals of the power supply apparatus.

By operating the controller in the first control mode, the output current of the power supply apparatus can be controlled to be constant. In the first control mode, the power supply apparatus can be operated as a power supply apparatus for manual welding and touch-start TIG welding, in which a welding electrode and a workpiece connected to the respective ones of the two output terminals of the power supply apparatus are contacted or short-circuited to thereby generate an arc between them.

By connecting, as occasion demands, a high-frequency generator, which provides a high-frequency voltage between the output terminals of the power supply apparatus, and operating the controller in the second control mode, the power supply apparatus can operate as a power supply apparatus for a high-frequency-start TIG welder. In this case, if the high-frequency generator is not used, the power supply apparatus operates as a power supply apparatus for a manual welder and a touch-start TIG welder.

If a wire feeder is used with the power supply apparatus and the third control mode is selected, the apparatus can operate as a power supply apparatus for a MIG welder. In this case, if the first control mode is selected, the apparatus operates as a power supply apparatus for manual welding and touch-start TIG welding.

The power supply apparatus may include a high-frequency generator built in it, so that it can be used for a high-frequency start TIG welder as well as for a manual welder or a touch-start TIG welder.

The power supply apparatus may include a wire feeder built in it, so that it can be used for an MIG welder as well as for a manual welder or a touch-start TIG welder.

The power supply apparatus according to the present invention may include an AC/DC switching circuit operable in a selected one of first and second states. In the first state, the AC/DC switching circuit causes the DC voltage provided by the output-side high-frequency-to-DC converter to be converted to an AC voltage for application to the output terminals of the power supply apparatus. The AC/DC switching circuit in the second state operates to couple the DC voltage from the output-side high-frequency-to-DC converter to the output terminals. Thus, the power supply apparatus can be used as a power supply apparatus for AC TIG welding, too.

The power supply apparatus may include a mode selection commander for supplying the controller with a command to select one of the first, second and third control modes. The mode selection commander may comprise a single control device, which is manipulated to select a desired control mode.

The power supply apparatus according to the present invention may include a parameter selection commander for supplying the controller with a command to select a parameter or parameters appropriate to the control mode selected by the mode selection command. The parameter selection commander may desirably comprise a single control device, which, when manipulated, can automatically set a parameter required for the welder with which the power supply apparatus is used.

The reference-current-representative signal and the reference-voltage-representative signal may be set by a single setting device. Thus the same setting device can be used for setting both the reference-current-representative signal to be used in the first control mode and the reference-voltage-representative signal used in the third control mode. Thus, the number of setting devices can be decreased.

The power supply apparatus can be provided with a mode display displaying the mode selected by the mode selection commander and a parameter display displaying the parameter selected by the parameter selection commander. An operator can readily know the selected control mode and the selected parameter from the displays.

A fixed voltage providing circuit may be disposed between the output of the input-side AC-to-DC converter and the input of the DC-to-high-frequency converter, which supplies a fixed input voltage to the DC-to-high-frequency converter. This arrangement can make the power supply apparatus operable from either one of, for example, 200 V and 400 V commercial AC voltages.

The power supply apparatus may be manufactured in the following way. First, a basic unit is provided. The basic unit includes an input-side AC-to-DC converter for converting a commercial AC voltage to a DC voltage, a DC-to-high-frequency for converting the DC voltage from the input-side AC-to-DC converter to a high-frequency voltage, a transformer transforming the high-frequency voltage to a predetermined voltage, and an output-side high-frequency-to-DC converter for converting the transformed high-frequency voltage from the transformer to a DC voltage for application to two output terminals to be coupled to a welder load. The basic unit includes further a current detector for detecting current flowing through the output terminals and developing a current-representative signal representing the detected current, and a voltage detector for detecting the voltage appearing between the two output terminals and developing a voltage-representative signal representing the detected voltage. The basic unit also includes a controller having a first, a second and a third control mode. In the first control mode, the controller controls the DC-to-high-frequency converter in such a manner that the current-representative signal can be equal to a reference-current-representative signal representing a predetermined reference current. In the second control mode, the controller activates and, then, deactivates a high-frequency generator that can be connected to provide a high-frequency between the two output terminals before operating in the first control mode. The controller in the third control mode controls the DC-to-high-frequency control in such a manner that the voltage-representative signal can be equal to a reference-voltage-representative signal representing a predetermined reference voltage, and also controls a wire feeder to be used with the power supply apparatus to feed a wire to be connected to one of the two output terminals.

A power supply apparatus for use with a manual welder and a high-frequency-start TIG welder can be provided by adding the high-frequency generator to the basic unit. If the wire feeder is added to the basic unit, a power supply apparatus for use with a manual welder and an MIG welder is produced. If both of the high-frequency generator and the wire feeder are added to the basic unit, a power supply apparatus for manual welding, high-frequency-start TIG welding and MIG welding results.

Thus, various types of welding power supply apparatuses can be readily provided by adding a small number of components to the basic unit.

DETAILED DESCRIPTION OF EMBODIMENT

Figure 9:
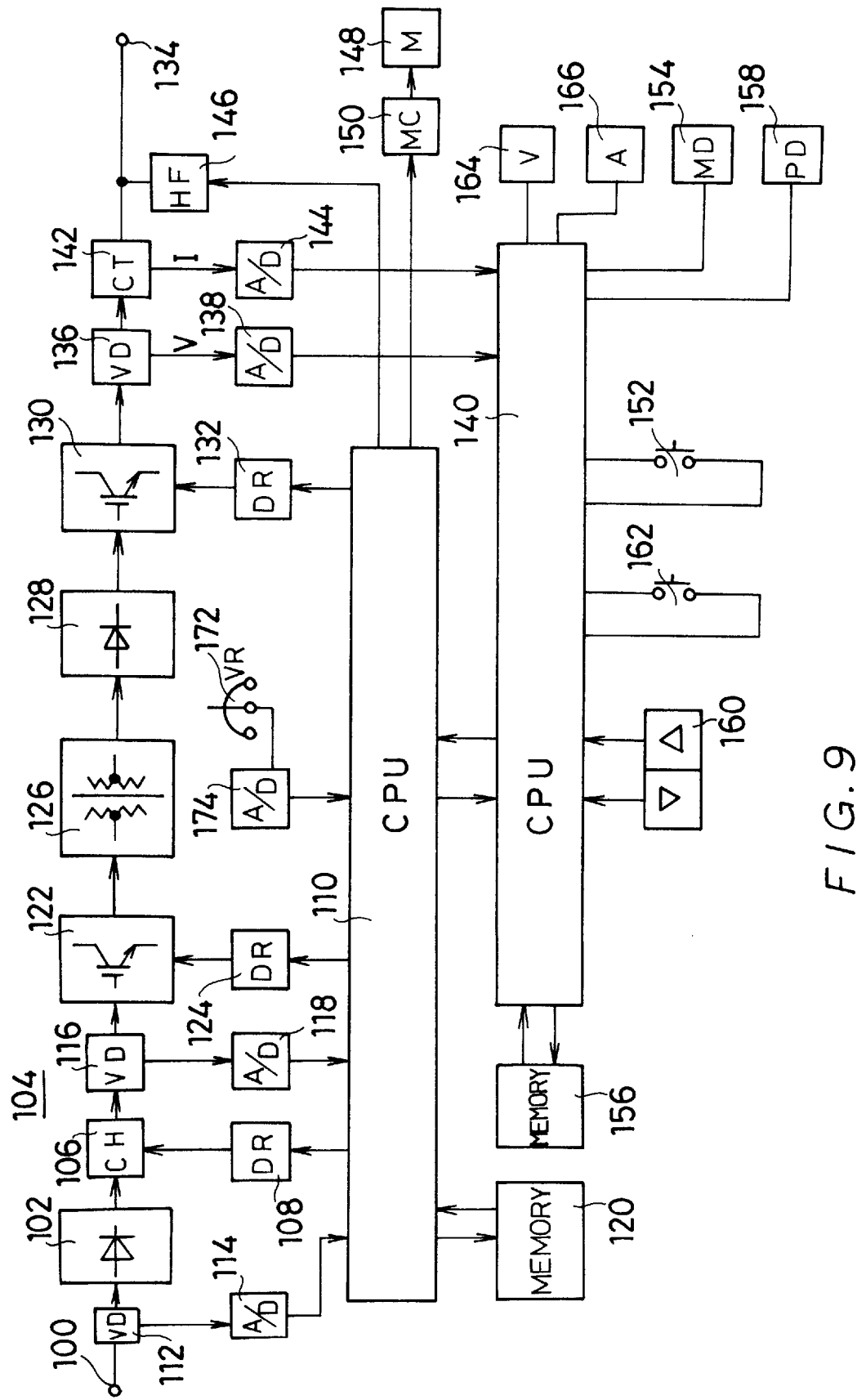
FIG. 9 is a block circuit diagram of a welding power supply apparatus according to an embodiment of the present invention.

A welding power supply apparatus according to an embodiment of the present invention is now described with reference to FIGS. 9 and 10. The power supply apparatus according to the present invention can be used for manual welding, DC TIG welding, AC/DC TIG welding and MIG welding. As shown in FIG. 9, the power supply apparatus includes a supply voltage input terminal 100 to which a commercial AC voltage is to be applied. The commercial AC voltage received at the input terminal 100 is coupled to an input-side AC-to-DC converter 102, where it is converted into a DC voltage. The input-side AC-to-DC converter 102 may comprise a full-wave or half-wave rectifier and smoothing capacitors.

A DC voltage from the input-side AC-to-DC converter 102 is applied to a fixed voltage providing circuit 104. The fixed voltage providing circuit 104 may comprise a chopper circuit (CH) 106 including semiconductor switching devices, such as IGBTs, power FETs and power bipolar transistors. The chopper circuit 106 is ON-OFF controlled in response to PWM signals provided by a chopper driver circuit (DR) 108. The driver circuit 108 provides the PWM signals in response to a command given by a first CPU 110. The voltage at the input terminal 100 is detected by an input voltage detector (VD) 112, the output signal of which is converted into a digital input-voltage-representative signal in an analog-to-digital converter (A/D) 114. Also, the output voltage of the chopper circuit 106 is detected by a chopper output voltage detector (VD) 116, the output signal of which is converted into a digital chopper-output-voltagerepresentative signal in an A/D converter 118. The CPU 110 performs arithmetic operations on the digital input-voltage-representative signal and the digital chopper-output-voltage-representative signal in accordance with data stored in a memory 120, to thereby develop and provide a command to the chopper driver circuit 108 to maintain the chopper output voltage at a predetermined fixed DC voltage. With this arrangement, even when either one of AC voltages of different magnitudes, e.g. voltages of 200 V and 400 V, applied to the input terminal 100, the same fixed voltage is outputted from the fixed voltage providing circuit 104.

The fixed DC voltage from the fixed voltage providing circuit 104 is applied to a DC-to-high-frequency converter, e.g. a high-frequency inverter 122. The inverter 122 may include a plurality of semiconductor switching devices, e.g. IGBTs, power FETs or power bipolar transistors. The semiconductor switching devices are ON-OFF controlled in response to PWM signals supplied from a converter driver circuit, e.g. an inverter driver circuit (DR) 124, so that the input DC voltage is converted into a high-frequency voltage of ten-odd kilohertz to 100 KHz. As will be described later, a command is supplied to the inverter driver circuit 124 from the CPU 110.

The high-frequency voltage is applied to a transformer 126, where it is converted into a high-frequency voltage having a predetermined magnitude. The high-frequency voltage is applied to an output-side high-frequency-to-DC converter 128, where it is converted into a DC voltage.

The DC voltage from the output-side high-frequency-to-DC converter 128 is coupled to an AC/DC switching circuit 130. The AC/DC switching circuit 130 may have an inverter including a plurality of semiconductor switching devices connected in a full bridge configuration. The semiconductor switching devices are ON-OFF controlled in response to PWM signals applied thereto from an AC/DC switching circuit driver circuit (DR) 132. When an AC operation command is supplied to it from the CPU 110, the driver circuit 132 PWM controls the respective semiconductor switching devices so as to cause them to develop an AC voltage at, for example, ten-odd hertz to 200 Hz, which is lower than the frequency of the high-frequency signal developed by the inverter 122. If a DC command is applied to the driver circuit 132 from the CPU 110, the driver circuit 132 maintains conductive those two of the semiconductor switching devices which are connected in series with the later-mentioned load interposed between them. The remaining semiconductor switching devices are maintained nonconductive. Thus, a DC voltage is continuously supplied to the load. Depending on the polarity of the DC voltage to be applied to the load, a different pair of semiconductor switching devices to be made continuously conductive is selected from the plurality of switching devices.

The AC/DC switching circuit 130 may have a different arrangement. For example, the output-side high-frequency-DC converter may be provided with a positive output terminal, a negative output terminal and a feedback terminal. The positive output terminal is connected through a chopper circuit to one end of a load, and the negative output terminal is connected through another chopper circuit to the same one end of the load, with the feedback terminal connected to the other end of the load. When an AC voltage is to be applied to the load, the two chopper circuits are alternately rendered conductive, and if a DC voltage is to be applied to the load, one of the chopper circuits is continuously made conductive.

The output voltage of the AC/DC switching circuit 130 is coupled to an output terminal 134 of the power supply apparatus. Although only one output terminal 134 is shown, the power supply apparatus actually has two output terminals, namely, positive and negative output terminals. One of the two output terminals is connected to a workpiece, while the other output terminal is connected to a welding electrode, for example, a collet of a TIG welder or a contact tip of an MIG welder.

Another voltage detector 136 detects the output voltage of the AC/DC switching circuit 130, and an A/D converter 138 converts the output signal of the detector 136 into a digital form to thereby form a digital voltage-representative signal, which is, then, applied to a second CPU 140. The output current of the AC/DC switching circuit 130 is detected by a current detector (CD) 142, and an A/D converter 144 converts the output signal of the current detector 142 into a digital form to thereby form a digital current-representative signal. The digital current-representative signal is applied to the CPU 140.

In the illustrated embodiment, a high-frequency generator (HF) 146 is connected to the output terminal 134. The high-frequency generator 146 provides a high-frequency, high voltage of, for example, from 5 KV to 20 KV, having a frequency of, for example, from 1 MHz to 3 MHz. The output voltage of the high-frequency generator 146 is applied between the two output terminals 134. The high-frequency generator 146 is activated and deactivated in response to a command from the CPU 110.

In the illustrated embodiment, a wire feeder for feeding a wire to be used in MIG welding is also used. The wire feeder may comprise a wire feeding motor 148 and a wire feeding motor control 150. The CPU 110 controls the wire feeding motor control 150.

The CPU 110 contains programs designed for the manual welding, the high-frequency-start TIG welding, the touch-start welding, the AC/DC TIG welding and the MIG welding. The CPU 110 contains also a program for use in gouging operation for forming a depression or through-hole in a steel plate by providing a large current to the welder.

The high-frequency generator 146, the wire feeding motor 148 and the motor control 150 are designed such that they can be easily coupled or decoupled to and from the power supply apparatus.

For the manual welding and the TIG welding, constant current control is provided, while constant voltage control is provided for the MIG welding. A reference-current-representative signal representing a reference current for use in the constant current control and a reference-voltagerepresentative signal representing a reference voltage for use in the constant voltage control are both set through a single output setting device 172. The output of the output setting device 172 is converted into a digital signal in an A/D converter 174 and is, then, applied to the CPU 110.

Data required by the CPU 110 for achieving the above-described controls is supplied to the CPU 110 from the CPU 140. The CPU 140 is provided with an operating mode selection commander. The operating mode selection commander may include an operating mode selecting push button 152 and an operating mode display (MD) 154. The manual welding operating mode is selected by pushing the button 152 once, and an indication of manual welding is displayed on the mode display 154. In the manual welding operating mode, the power supply apparatus is set for use with a manual welder. The high-frequency-start TIG welder operating mode is selected when the push button 152 is pushed once again, and the selection of this mode is displayed on the display 154. Another pushing of the button 152 selects the touch-start TIG welder operating mode, which is displayed on the display 154. To select the AC/DC TIG welder operating mode, the push button 152 is pressed again. Another pushing of the button 152 selects the MIG welding operating mode, and it is displayed on the display 154. If the push button 152 is pushed once again, the gouging mode is selected and is displayed on the mode display 154. By pushing the button 152 again, the operating mode returns to the manual welder operating mode. In this manner, the selection of the operating mode is done.

In each of the operating modes, appropriate parameters for driving the power supply apparatus in that operating mode must be set. For example, for DC TIG welding, it should be determined whether or not pulse control should be done, and, if it is to be done, in which manner the pulse control should be done. If the power supply apparatus is used for AC/DC TIG welding, it should be determined what frequency should be chosen for the AC frequency and what duty ratio should be set for the AC waveform. Data necessary for making such determinations is stored in a memory 156.

When the operating mode selecting push button 152 is pushed to set the operating mode of the power supply apparatus, parameters relating to the selected operating mode are displayed on a parameter display (PD) 158. The parameters selected and displayed can be changed to desired setting by means of a parameter changing control, e.g. an UP/DOWN push button 160.

Sometimes it may be necessary to set a plurality of parameters for a specific operating mode. For example, for pulse control, a pulse frequency and a value of the base current portion may have to be set. For setting different parameters for the same operating mode, a parameter selecting button 162 is pushed, so that a different parameter is selected each time the button 162 is pushed, and the selected parameter is displayed on the parameter display 158. After a desired parameter is selected, the UP/DOWN push button 160 is pushed to select a desired value of the selected parameter. In this way, desired values can be set for different parameters for one operating mode.

The magnitudes of the output voltage and current at the output terminal 134 are displayed on an output voltage display (V) 164 and an output current display (A) 166, respectively, which are connected to the CPU 140.

Figure 1:
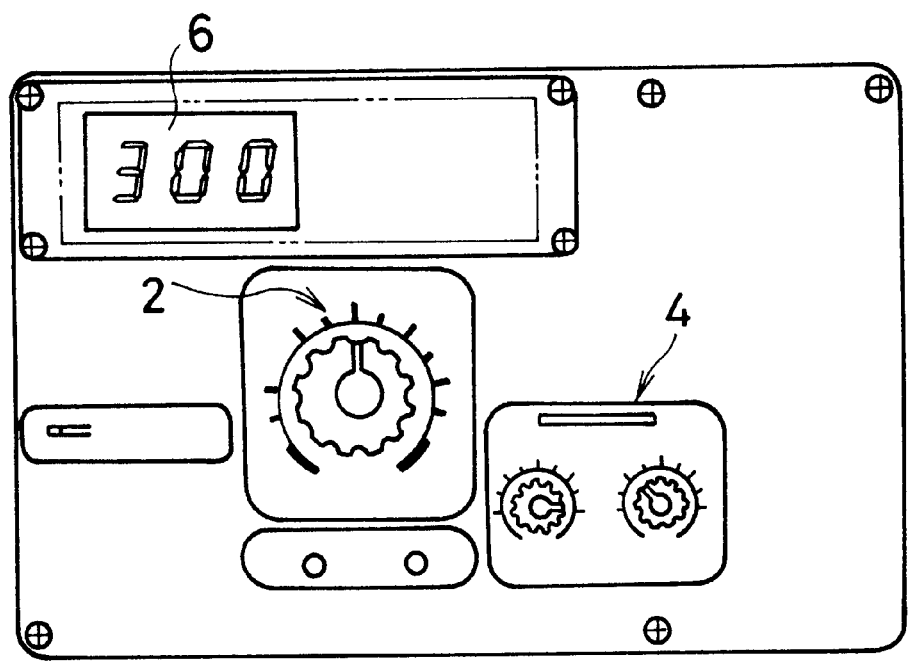
FIG. 1 shows a control panel of a prior art power supply apparatus for manual welding.
Figure 2:
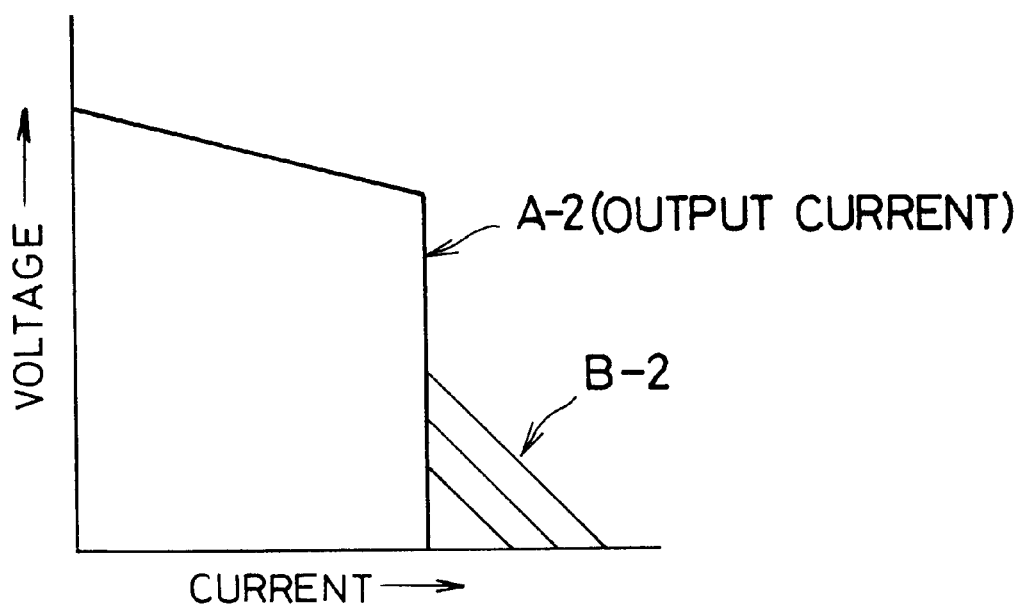
FIG. 2 shows the output characteristics of the power supply apparatus shown in FIG. 1.
Figure 3:
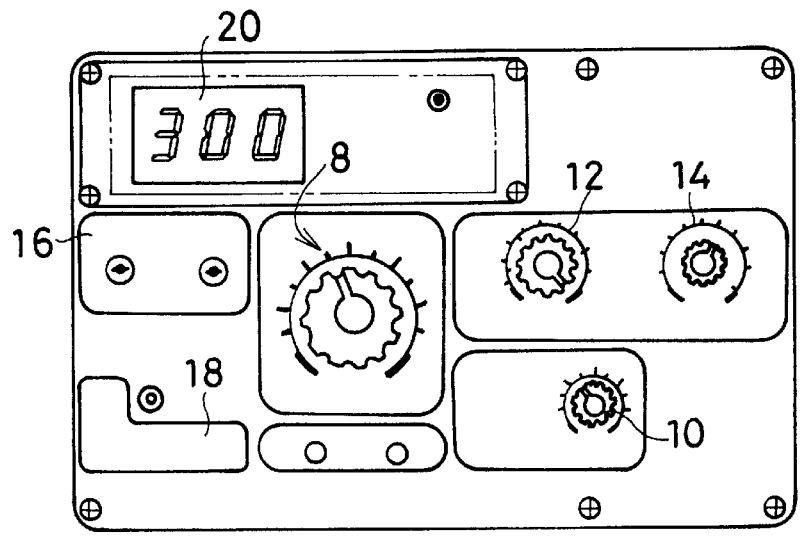
FIG. 3 shows a control panel of a prior art power supply apparatus for DC TIG welding.
Figure 4:
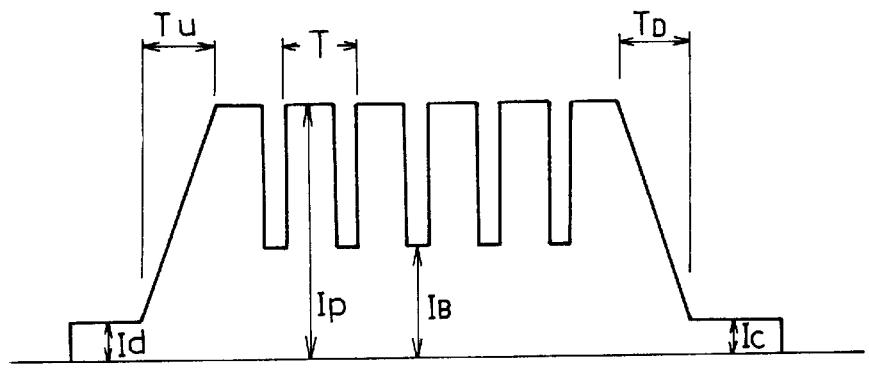
FIG. 4 shows the waveform of the output current of the power supply apparatus of FIG. 3.
Figure 5:
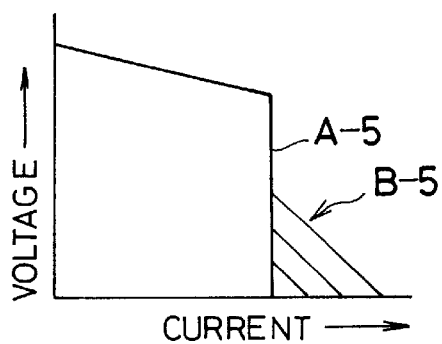
FIG. 5 shows the output voltage-current characteristics of the power supply apparatus of FIG. 3.
Figure 6:
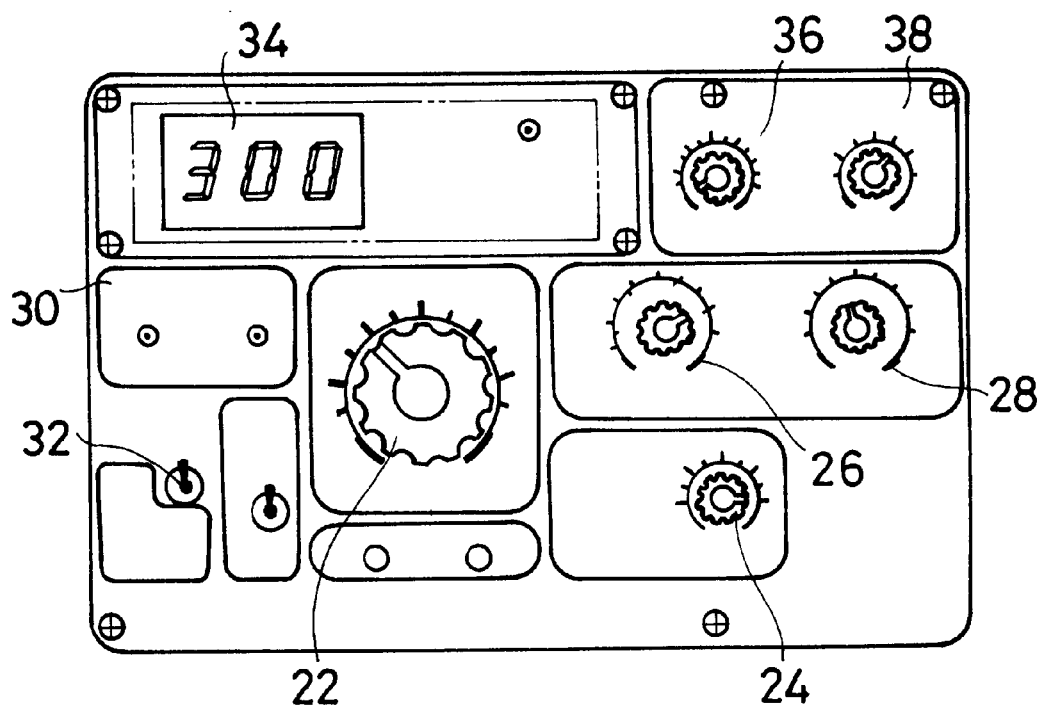
FIG. 6 shows a control panel of a prior art power supply apparatus for AC/DC TIG welding.
Figure 7:
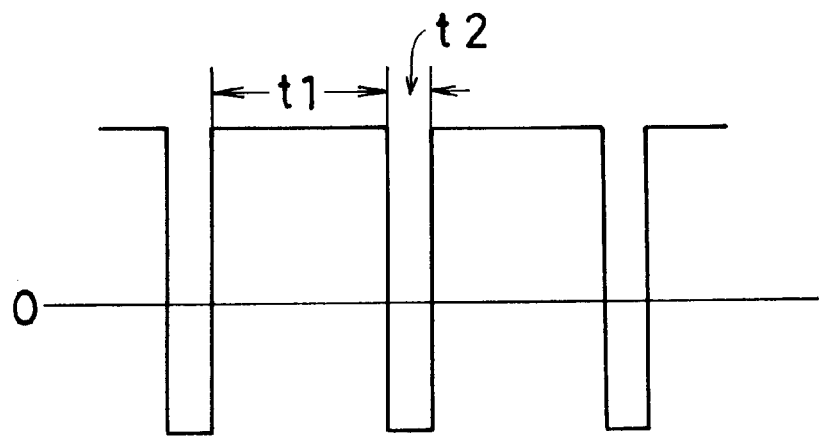
FIG. 7 shows the waveform of the output current of the power supply apparatus of FIG. 6.
Figure 8:
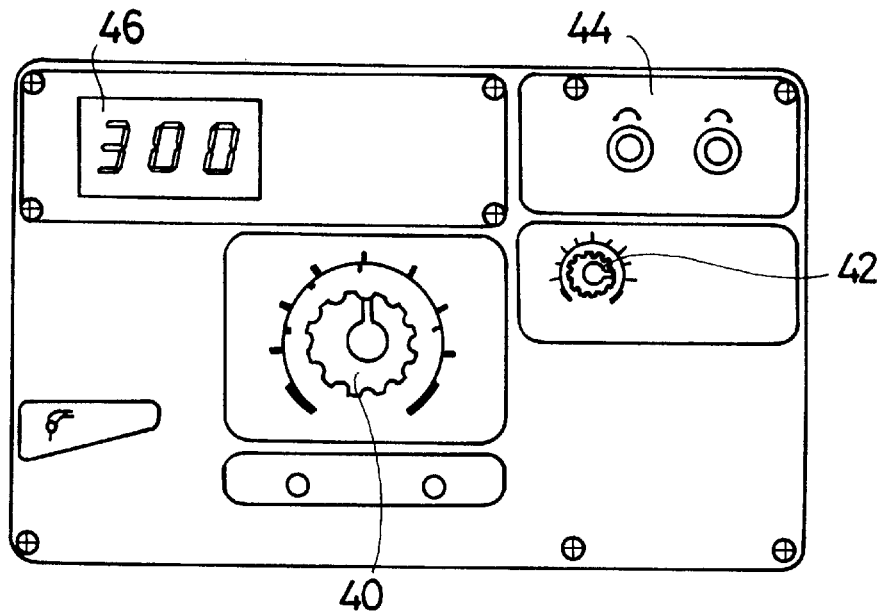
FIG. 8 shows a control panel of a prior art power supply apparatus for MIG welding.
Figure 10:
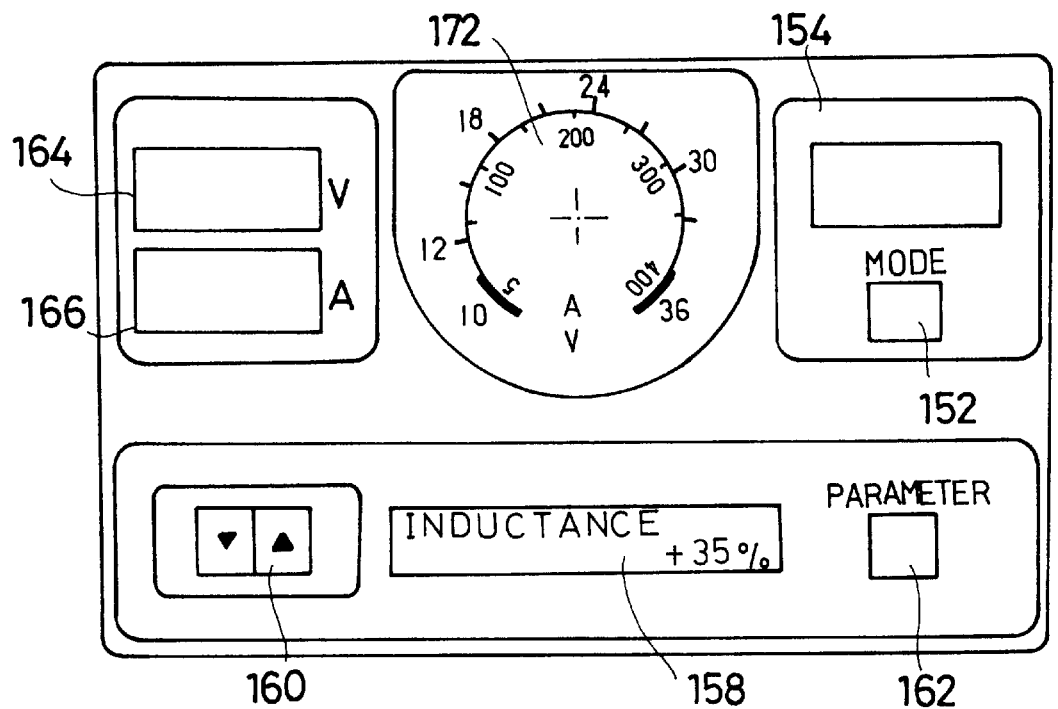
FIG. 10 shows a control panel of the welding power supply apparatus shown in FIG. 9.

FIG. 10 shows a control panel of the welder power supply apparatus according to the present invention. On the control panel, there are disposed the displays 154, 158, 164 and 166, the operating mode selecting push button 152, the UP/DOWN button 160, the parameter selecting button 162 and the output setting device 172. It should be noted that the number of the controls including the various push buttons 152, 160 and 162 and the output setting device 172 is small for the number of operating modes in which the power supply apparatus can operate.

Next, the respective operating modes are described.

1. Manual Welding

The push button 152 is operated to select the manual welding. On the display 154, letters, such as "MANUAL", are displayed. In this case, the AC/DC switching circuit 130 is switched into the state for supplying a DC voltage to a load. A welding torch and a workpiece are connected to the output terminal 134. When the torch and the workpiece are brought into contact with each other, current flows through the output terminal 134 and is detected by the output current detector 142. The output signal from the current detector 142 is converted into a digital current-representative signal, which, in turn, is applied too the CPU 140, where it is provided with appropriate processing. The result of processing is provided to the CPU 110. The CPU 110 gives the driver circuit 124 such a command as to make the output current equal to the reference current. The command is prepared on the basis of the reference current set through the output setting device 172, data stored in the memory 156 and data provided by the CPU 140.

The hot-starting can be selected through the button 162. If the percent increase of the output current, which is to be caused to flow when the hot-starting is used, has been already set through the button 160, the CPU 110 gives such a command to the driver circuit 124 as to cause the increased current to flow at the start of the manual welding operation.

2. High-Frequency-Start DC TIG Welding

When the high-frequency-start DC TIG welding is selected by means of the push button 152, letters "DC TIG" are displayed on the display 154. Using the push button 162 and the UP/DOWN button 160, the upslope time TU and the downslope TD are determined and displayed on the display 158. Also, using the same buttons 162 and 160, whether the pulse control should be provided or not is determined, and, if to be provided, the pulse frequency is determined. Such information is also displayed on the display 158. In this case, the AC/DC switching circuit 130 is switched to a state to supply a DC voltage to the load. The output of the current detector 142 is converted into a digital current-representative signal in the A/D converter 144. The digital current-representative signal is applied to the CPU 140 where arithmetic operations are achieved on it, and the result of the arithmetic operations is applied to the CPU 110.

The digital reference-current-representative signal resulting from digitizing, in the A/D converter 174, a reference-current-representative signal set through the output setting device 172 has been supplied to the CPU 110. The CPU 110 gives such a command to the driver circuit 124 as to make the output current as detected by the current detector 142 equal to the reference current. If any parameters have been set through the button 162 and/or others, control in accordance with the set parameters is carried out.

A digital signal representing high frequency starting is applied from the button 152 through the CPU 140 to the CPU 110. Then, the CPU 110 provides an activating signal to the high-frequency generator 146. The high-frequency generator 146 supplies a high-frequency, high voltage to the torch and the workpiece, which are connected to the terminal 134, to cause an arc to be generated between the torch and the workpiece. As described previously, once an arc is generated, constant current control is achieved. The CPU 110 determines whether an arc has been generated or not on the basis of the output of the voltage detector 136 and the output of the current detector 142, and when it determines that an arc has been generated, it causes the high-frequency generator 146 to stop operating.

3. Touch-Start DC TIG Welding

Touch-start DC TIG welding can be selected through the button 152. Then, letters "DC TIG" is displayed on the display 154. Touch-start DC TIG welding is similar to the high-frequency DC TIG welding described above except for the manner of generating an arc.

A digital signal representing touch-start welding is applied from the CPU 140 to the CPU 110. In the initial stage, the load is short-circuited. In other words, the welding electrode and the workpiece are initially in contact with each other. In this initial operating stage, the CPU 110 gives such a command to the driver circuit 124 that the current flowing through the electrode and the workpiece is smaller than the reference current. Then, the electrode is removed off from the workpiece to cause an arc to be generated between them.

If hot-start welding is selected by means of the button 162, control similar to the one done in the manual welding is provided.

4. AC/DC TIG Welding

If AC/DC TIG welding is selected through the button 152, letters "AC/DC TIG" are displayed on the display 154. Through the controls including the button 162, the pulse frequency and the duty ratio are set when AC TIG welding is done are set. If the power supply apparatus is used for DC TIG welding, the upslope time TU, the downslope time TD, whether pulse control is provided or not, and the pulse frequency, if pulse control is to be done are set through the button 162 etc.

DC TIG welding in the AC/DC TIG welding mode is the same as the DC TIG welding in the above-described high-frequency-start DC TIG welding or touch-start DC TIG welding.

For AC TIG welding, the AC/DC switching circuit 130 is switched to a state to supply an AC voltage having the set frequency and duty ratio to the load. The CPU 110 controls the inverter 122 in such a manner that a constant output current is provided to the load.

5. MIG Welding

MIG welding can be selected through the button 152. Then, letters "MIG" are displayed on the display 154. The controls including the push button 162 are used to enter data indicating the gas to be used, the type of the wire to be used, the diameter of the wire, and the magnitude of the current flowing when the wire and the workpiece are short-circuited by a molten wire material droplet. The data is displayed on the display 158. In the example shown in FIG. 10, the magnitude of the decreased current flowing when the wire and the workpiece are short-circuited with each other by a molten wire material is displayed in terms of inductance, namely, as "INDUCTANCE +35%", which indicates that the current is suppressed by increasing the inductance by 35%.

When the power supply apparatus is turned on, the CPU 110 switches the AC/DC switching circuit 130 into a state in which a DC voltage is applied to the load. The CPU 110 gives a command to the driver circuit 124 to make the output voltage as detected in the voltage detector 136 become equal to the reference voltage as set through the output setting device 172. Thus, the power supply apparatus is constant-voltage controlled.

Data corresponding to the type and diameter of the wire set is read out from the memory 156, and a command based on the read out data is supplied to the wire feeding motor control 150. The motor control 150 controls the wire feeding motor 148 so that the feeding rate of the wire, which is a consumable welding electrode, is controlled. The wire is brought into contact with the workpiece, so that current flows between them to generate Joule heat. The Joule heat melts the wire portion which is in contact with the workpiece. The molten wire material is separated from the wire and drops onto the workpiece. As the wire is separated from the workpiece, an arc is generated between them. The wire, being continuously forwarded by the wire feeding motor 148, is heated by the arc to melt into a molten droplet of the wire material, which short-circuits the wire and the workpiece. Then, the droplet drops onto the workpiece, so that the wire and the workpiece are separated from each other, causing an arc to be generated between them. This process is repeated, so the wire melts to weld the workpiece. This is the MIG welding.

6. Gouging

Gouging may be selected by pushing the button 152. Control similar to the one given for MIG welding. However, the rate of feeding the wire is slower and a larger current is supplied to the load, whereby the workpiece is gouged.

As described above, according to the present invention, a single power supply apparatus can be used for various types of welding. In particular, since, in manual welding and touch-start TIG welding, the electrode and the workpiece are contacted at the start of welding, and the output current is constant current controlled, the same components can be used for the two types of welding if the rated output current is the same. Therefore, when manufacturing the power supply apparatus according to the present invention, an apparatus which can be used in common to manual and touch-start TIG welding is first prepared as a basic unit.

A power supply apparatus for a high-frequency-start TIG welder is formed by adding the high-frequency generator 146 to the basic unit.

A power supply apparatus for use with a MIG welder, a manual welder and a touch-start TIG welder is formed by adding the wire feeding motor 148 and the wire feeding motor control 150 to the basic unit.

The addition of the high-frequency generator 146, the wire feeding motor 148 and the wire feeding motor control 150 to the basic unit provides a power supply apparatus for use in any of MIG welding, high-frequency-start TIG welding, manual welding and touch-start TIG welding.

Speaking in a different way, when designing a power supply apparatus for welding machines, a power supply apparatus for use in any of MIG welding, high-frequency-start TIG welding, touch-start TIG welding and manual welding may be first designed. During the manufacturing of such apparatus, a power supply apparatus for MIG welding, touch-start TIG welding and manual welding can be obtained by removing or not adding the high-frequency generator 146. If the wire feeding motor 148 and the wire feeding motor control 150 are removed, a power supply apparatus for high-frequency-start TIG welding, touch-start welding and manual welding results.

If the high-frequency generator 146, the wire feeding motor 148 and the wire feeding motor control 150 are removed, the basic unit remains, which is suitable for use in touch-start TIG welding and manual welding.

Any of the above-described three types of power supply apparatuses can be used for AC/DC TIG welding.

According to the above-described embodiment, the power supply apparatus has six modes of operation, namely, manual welding, high-frequency-start TIG welding, touch-start TIG welding, AC/DC TIG welding, MIG welding and gouging, but any other modes, such as a mode in which pulse current is used in MIG welding, can be added.

The AC/DC switching circuit 130 can be removed if the apparatus is aimed only for DC welding.

Furthermore, a single CPU, instead of the two CPU 110 and 140, can be used. Similarly, a single memory can be substituted for the two memories 120 and 156.

What is claimed is:

1. A power supply apparatus for use in welding, comprising:

an input-side AC-to-DC converter for converting a commercial AC voltage into a DC voltage;

a DC-to-high-frequency converter for converting the DC voltage developed by said input-side AC-to-DC converter to a high-frequency voltage;

a transformer for voltage-transforming the high-frequency voltage from said DC-to-high-frequency converter to a high-frequency voltage having a predetermined value;

an output-side high-frequency-to-DC converter for converting the high-frequency voltage developed by said transformer to a DC voltage and applying the DC voltage between two output terminals adapted to be connected to a load;

a current detector adapted to detect current flowing through said output terminals and to develop a current-representative signal representing the detected current;

a voltage detector for detecting a voltage between said output terminals and developing a voltage-representative signal representing the detected voltage; and a controller selectively operable in first, second and third control modes, said controller being adapted to control, in said first control mode, said DC-to-high-frequency converter in such a manner that said current-representative signal becomes equal to a reference-current representative signal representing a reference current having a predetermined value, said controller, in said second control mode, being adapted to activate and then deactivate a high-frequency generator to be used to provide a high-frequency voltage between said output terminals and thereafter to control said DC-to-high-frequency converter in the same manner as in said first control mode, said controller, in said third control mode, being adapted to control said DC-to-high-frequency converter in such a manner that said voltage-representative signal becomes equal to a reference-voltage representative signal representing a reference voltage having a predetermined value and also control a wire feeder to be used to feed a wire to be connected to one of said output terminals.

2. The power supply apparatus according to claim 1 further comprising said high-frequency generator.

3. The power supply apparatus according to claim 1 further comprising said wire feeder.

4. The power supply apparatus according to claim 1 further comprising an AC/DC switching circuit operable in a selected one of first and second states, said AC/DC switching circuit in said first state causing the DC voltage provided by said output-side high-frequency-to-DC converter to be converted to an AC voltage for application to said output terminals, said AC/DC switching circuit in said second state operating to cause the DC voltage provided by said output-side high-frequency-to-DC converter to be coupled to the output terminals.

5. The power supply apparatus according to claim 1 further comprising a mode selection commander for supplying to said controller a mode selection command to operate in one of said first, second and third control modes.

6. The power supply apparatus according to claim 5 further comprising a parameter selection commander for supplying to said controller a parameter selection command to select a parameter appropriate to the control mode selected in accordance with the mode selection command.

7. The power supply apparatus according to claim 6 further comprising a single setting device for setting both said reference current and said reference voltage.

8. The power supply apparatus according to claim 6 further comprising a mode display for displaying the mode selected in accordance with the mode selection command, and a parameter display for displaying the parameter selected in accordance with the parameter selection command.

9. The power supply apparatus according to claim 1 further comprising a fixed-voltage providing circuit disposed between said input-side AC-to-DC converter and said DC-to-high-frequency converter for providing a fixed voltage to said DC-to-high-frequency converter.

10. A method of manufacturing a power supply apparatus for use in welding, comprising:

the step of preparing a basic unit including an input-side AC-to-DC converter for converting a commercial AC voltage into a DC voltage, a DC-to-high-frequency converter for converting the DC voltage developed by said input-side AC-to-DC converter to a high-frequency voltage, a transformer for voltage-transforming the high-frequency voltage from said DC-to-high-frequency converter to a high-frequency voltage having a predetermined value, an output-side high-frequency-to-DC converter for converting the high-frequency voltage developed by said transformer to a DC voltage and applying the DC voltage between two output terminals adapted to be connected to a load, a current detector adapted to detect current flowing through said output terminals and to develop a current-representative signal representing the detected current, a voltage detector for detecting a voltage between said output terminals and developing a voltage-representative signal representing the detected voltage, and a controller selectively operable in first, second and third control modes, said controller in said first control mode controlling said DC-to-high-frequency converter in such a manner that said current-representative signal becomes equal to a reference-current representative signal representing a reference current having a predetermined value, said controller, in said second control mode, being adapted to activate and then deactivate a high-frequency generator to be used to provide a high-frequency voltage between said output terminals and thereafter control said DC-to-high-frequency converter in the same manner as in said first control mode, said controller in said third control mode, being adapted to control said DC-to-high-frequency converter in such a manner that said voltage-representative signal becomes equal to a reference-voltage representative signal representing a reference voltage having a predetermined value and also controlling a wire feeder to be used to feed a wire to be connected to one of said output terminals; and the step of performing a selected one of adding said high-frequency generator to said basic unit, adding said wire feeder to said basic unit, and adding said high-frequency generator and wire feeder to said basic unit.

* * * * *